(12) United States Patent
Ferguson et al.

(10) Patent No.: US 11,645,696 B2
(45) Date of Patent: ***May 9, 2023

(54) DELIVERY SYSTEM HAVING ROBOT VEHICLES WITH TEMPERATURE AND HUMIDITY CONTROL COMPARTMENTS

(71) Applicant: Nuro, Inc., Mountain View, CA (US)

(72) Inventors: David Ferguson, San Francisco, CA (US); Jiajun Zhu, Palo Alto, CA (US); Nan Ransohoff, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,819

(22) Filed: Dec. 1, 2021

(65) Prior Publication Data
US 2022/0092673 A1 Mar. 24, 2022

Related U.S. Application Data

(63) Continuation of application No. 16/654,216, filed on Oct. 16, 2019, now Pat. No. 11,222,378, which is a
(Continued)

(51) Int. Cl.
*G05D 1/00* (2006.01)
*G06Q 30/0601* (2023.01)
(Continued)

(52) U.S. Cl.
CPC ............ *G06Q 30/0631* (2013.01); *A23L 2/52* (2013.01); *A23L 5/00* (2016.08); *A23L 7/109* (2016.08);
(Continued)

(58) Field of Classification Search
CPC ....... G07F 17/0057; G07F 17/12; G07C 5/08; G07C 5/02; G07C 9/00896;
(Continued)

(56) References Cited

U.S. PATENT DOCUMENTS 4,527,158 A 7/1985 Runnels
4,777,416 A 10/1988 George, II et al.
(Continued)

OTHER PUBLICATIONS

John Leonard, et al., "A Perception-Driven Autonomous Urban Vehicle," Massachusetts Institute of Technology, Journal of Field Robotics, 1-48 (2008), Published online in Wiley InterScience (www.interscience.wiley.com), Sep. 2008, 48 pages.

*Primary Examiner* — Shardul D Patel
(74) *Attorney, Agent, or Firm* — Edell, Shapiro & Finnan, LLC

(57) ABSTRACT

An autonomous robot vehicle in accordance with aspects of the present disclosure includes a conveyance system and a compartment coupled to the conveyance system. The conveyance system autonomously drives the autonomous robotic vehicle between one or more storage locations and one or more delivery locations. The compartment receives one or more items stored at the one more storage locations. The compartment includes a temperature control module configured to maintain the compartment within a predetermined temperature range to provide temperature control for the one or more items as the conveyance system drives between the one or more storage locations and the one or more delivery locations.

20 Claims, 12 Drawing Sheets

Related U.S. Application Data continuation of application No. 16/159,016, filed on Oct. 12, 2018, now Pat. No. 10,486,640, which is a continuation-in-part of application No. PCT/US2018/044361, filed on Jul. 30, 2018.

(60) Provisional application No. 62/538,538, filed on Jul. 28, 2017.

(51) Int. Cl.

| | |
|---|---|
| *G08G 1/04* | (2006.01) |
| *B60P 3/00* | (2006.01) |
| *B60R 21/34* | (2011.01) |
| *B65G 67/24* | (2006.01) |
| *G01C 21/34* | (2006.01) |
| *G05D 1/02* | (2020.01) |
| *G05D 1/12* | (2006.01) |
| *G06K 7/10* | (2006.01) |
| *G06Q 10/0631* | (2023.01) |
| *G06Q 10/083* | (2023.01) |
| *G06Q 50/12* | (2012.01) |
| *G06Q 50/28* | (2012.01) |
| *G08G 1/00* | (2006.01) |
| *H04L 67/12* | (2022.01) |
| *G06Q 10/08* | (2023.01) |
| *G06N 20/00* | (2019.01) |
| *B60R 25/25* | (2013.01) |
| *A23L 5/00* | (2016.01) |
| *A23L 7/109* | (2016.01) |
| *G06F 16/955* | (2019.01) |
| *A23L 2/52* | (2006.01) |
| *A47J 37/06* | (2006.01) |
| *A47J 47/00* | (2006.01) |
| *B60H 1/00* | (2006.01) |
| *B60P 1/36* | (2006.01) |
| *B60P 3/025* | (2006.01) |
| *B60R 19/18* | (2006.01) |
| *G06K 7/14* | (2006.01) |
| *G06K 19/06* | (2006.01) |
| *G06Q 10/0635* | (2023.01) |
| *G06Q 10/0832* | (2023.01) |
| *G06Q 10/0833* | (2023.01) |
| *G06Q 10/0834* | (2023.01) |
| *G06Q 10/0835* | (2023.01) |
| *G06Q 10/0837* | (2023.01) |
| *G06Q 20/00* | (2012.01) |
| *G06Q 20/12* | (2012.01) |
| *G06Q 20/18* | (2012.01) |
| *G06Q 30/0645* | (2023.01) |
| *G07F 17/00* | (2006.01) |
| *G07F 17/12* | (2006.01) |
| *G07C 5/02* | (2006.01) |
| *G07C 5/08* | (2006.01) |
| *G06V 20/56* | (2022.01) |
| *G06V 20/64* | (2022.01) |
| *G06Q 30/0251* | (2023.01) |
| *G06Q 50/30* | (2012.01) |
| *G06K 19/07* | (2006.01) |
| *H04W 4/024* | (2018.01) |
| *H04W 4/40* | (2018.01) |
| *G01C 21/20* | (2006.01) |
| *B60R 19/48* | (2006.01) |
| *G06F 3/0484* | (2022.01) |
| *B60R 21/36* | (2011.01) |
| *H04N 5/76* | (2006.01) |
| *H05B 6/68* | (2006.01) |

(52) U.S. Cl.
CPC ........... *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC .. G07C 9/00563; G07C 9/00571; G07C 9/28; G07C 2009/0092; G07C 2209/63; A23L 5/00; A23L 7/109; A23L 2/52; G06F 16/955; G06F 3/0484; G06F 3/017; A47J 37/0658; A47J 47/00; B60H 1/00364; B60H 1/00735; B60P 1/36; B60P 3/0257; B60P 3/007; B60R 19/18; B60R 25/252; B60R 25/25; B60R 21/34; B60R 19/483; B60R 21/36; B60R 2021/346; G06K 7/1413; G06K 19/06028; G06K 7/10722; G06K 9/00201; G06K 9/00791; G06K 7/10297; G06K 19/0723; G06Q 10/0635; G06Q 10/0832; G06Q 10/0833; G06Q 10/0834; G06Q 10/0835; G06Q 10/0837; G06Q 20/00; G06Q 20/127; G06Q 20/18; G06Q 30/0631; G06Q 30/0645; G06Q 10/08; G06Q 10/0631; G06Q 10/06315;

G06Q 10/083; G06Q 50/12; G06Q 50/28;
G06Q 10/08355; G06Q 30/0266; G06Q
50/30; G06Q 10/00; G06N 20/00; G01C
21/343; G01C 21/3438; G01C 21/3453;
G01C 21/20; B65G 67/24; G05D 1/0027;
G05D 1/0033; G05D 1/0094; G05D
1/0214; G05D 1/12; G05D 1/0038; G05D
1/0223; G05D 1/0212; G05D 1/0088;
G05D 1/0276; G05D 1/0291; G05D
1/0061; G05D 1/0231; G05D 2201/0207;
G05D 2201/0213; G05D 1/0297; G05D
1/0295; G05D 1/00; G08G 1/202; G08G
1/04; G08G 1/22; H04L 67/12; H04W
4/024; H04W 4/40; A23V 2002/00; H04N
5/76; H05B 6/688; B64C 2201/128;
B64C 2201/141
USPC .......................................................... 701/516
See application file for complete search history.

(56) References Cited

U.S. PATENT DOCUMENTS

| | | |
|---|---|---|
| 5,204,814 A | 4/1993 | Nooman et al. |
| 5,377,106 A | 12/1994 | Drunk et al. |
| 5,510,763 A | 4/1996 | Deckard et al. |
| 6,170,242 B1 | 1/2001 | Gordon |
| 6,556,598 B1 | 4/2003 | Angott |
| 6,598,692 B2 | 7/2003 | Angott |
| 6,600,981 B2 | 7/2003 | Ruffner |
| 8,528,685 B2 | 9/2013 | Scherbring et al. |
| 8,579,055 B2 | 11/2013 | Sasahara et al. |
| 9,796,529 B1 | 10/2017 | Hoareau et al. |
| 10,486,640 B2 * | 11/2019 | Ferguson ........... G06Q 10/0837 |
| 10,654,394 B2 | 5/2020 | Goldberg et al. |
| 11,222,378 B2 * | 1/2022 | Ferguson .............. B60R 25/252 |
| 11,447,055 B2 * | 9/2022 | Kanitz ...................... B60P 1/36 |
| 11,449,050 B2 * | 9/2022 | Ferguson ............. G08G 1/0175 |
| 2003/0056481 A1 | 3/2003 | Trelz |
| 2003/0236723 A1 | 12/2003 | Angott |
| 2004/0093650 A1 | 5/2004 | Martins et al. |
| 2006/0059880 A1 | 3/2006 | Angott |
| 2008/0086421 A1 | 4/2008 | Phillips et al. |
| 2009/0111910 A1 | 4/2009 | Gimvang |
| 2009/0183478 A1 | 7/2009 | Bemnini |
| 2010/0006120 A1 | 1/2010 | Van Den Berg |
| 2010/0084426 A1 | 4/2010 | Devers et al. |
| 2013/0317680 A1 | 11/2013 | Yamamura et al. |
| 2014/0032033 A1 | 1/2014 | Einecke et al. |
| 2014/0080670 A1 | 3/2014 | Elder et al. |
| 2014/0081445 A1 | 3/2014 | Villamar |
| 2015/0006005 A1 * | 1/2015 | Yu ........................... G06Q 50/28 |
| | | 701/22 |
| 2017/0174343 A1 | 6/2017 | Erickson et al. |
| 2018/0061162 A1 | 3/2018 | High et al. |
| 2018/0282014 A1 * | 10/2018 | Atchley ............... B65D 5/6635 |
| 2018/0356823 A1 * | 12/2018 | Cooper .................. G01C 21/20 |

* cited by examiner

DELIVERY SYSTEM HAVING ROBOT VEHICLES WITH TEMPERATURE AND HUMIDITY CONTROL COMPARTMENTS

CROSS-REFERENCE TO RELATED APPLICATIONS

The present application is a continuation of U.S. patent application Ser. No. 16/654,216, filed Oct. 16, 2019, which is a continuation of U.S. patent application Ser. No. 16/159,016, filed Oct. 12, 2018, which is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to delivery, and in particular, to a delivery system including one or more autonomous or semi-autonomous robot vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of groceries by autonomous vehicles could improve society in many ways. For example, rather than spending time driving to/from a grocery store, wondering through the grocery store to locate desired grocery items, and waiting on lines to pay for the grocery items, a customer can instead engage in productive work, entertainment, and/or rest while waiting for an autonomous vehicle to deliver the grocery items to them. Accordingly, there is interest in developing technologies for handling and delivering grocery items by autonomous robot vehicles.

SUMMARY

This disclosure relates to a grocery delivery system including a fully-autonomous and/or semi-autonomous robot fleet and, in particular, to a fleet of one or more robot vehicles for transporting or retrieving deliveries in either unstructured outdoor environment or closed environments.

In one aspect, the present disclosure is directed to an autonomous robotic vehicle. The autonomous robotic vehicle includes a conveyance system and a storage compartment coupled to the conveyance system. The conveyance system is configured to autonomously drive the autonomous robotic vehicle between one or more grocery storage locations and one or more delivery locations. The storage compartment is coupled to the conveyance system and configured to receive one or more grocery items stored at the one or more grocery storage locations. The storage compartment includes a temperature control module configured to maintain the storage compartment within a predetermined temperature range to provide temperature control for the one or more grocery items as the conveyance system drives between the one or more grocery storage locations and the one or more delivery locations.

In embodiments, the temperature control module may include a heater that is configured to raise a temperature within the storage compartment to maintain the temperature within the predetermined temperature range. The predetermined temperature range may be between about 40 degrees Fahrenheit and about 500 degrees Fahrenheit.

In various embodiments, the temperature control module may include a cooler that is configured to lower a temperature within the storage compartment to maintain the temperature within the predetermined temperature range. The predetermined temperature range may be between about 32 degrees Fahrenheit and about 40 degrees Fahrenheit. The predetermined temperature range may be below about 32 degrees Fahrenheit.

In some embodiments, the autonomous robotic vehicle may further include a humidity control module that controls humidity levels within the storage compartment.

In embodiments, the temperature control module may be configured to selectively raise or lower a temperature within the storage compartment to maintain the storage compartment within the predetermined temperature range.

In certain embodiments, the temperature control module may be configured to adjust the temperature within the storage compartment based on an optimal temperature range for the one or more grocery items.

According to another aspect, the present disclosure is directed to grocery delivery system including a database, a communication system, one or more processors, and a memory. The database is configured to store a list of groceries for delivery by an autonomous vehicle. The database is further configured to store information of a delivery location and of one or more grocery storage locations. The communication system is configured to communicate with computing devices to enable the one or more grocery items to be selected from the list of groceries stored on the database to create a grocery order. The memory stores instructions which, when executed by the one or more processors, cause the grocery delivery system to access, in the database, the grocery order; instruct the one or more storage locations to load the grocery order on the autonomous vehicle; and instruct the autonomous vehicle to travel to the delivery location when the grocery order is loaded in the autonomous vehicle.

In various embodiments, the grocery delivery system may further include a fleet of autonomous robot vehicles.

In embodiments, the communication system may be configured to communicate with each autonomous robot vehicle of the fleet of autonomous robot vehicles and to receive grocery orders from software applications on computing devices of customers.

In some embodiments, the database may be configured to store information for each autonomous robot vehicle of the fleet. The information may include equipment inventory for each autonomous robot vehicle and grocery inventory of grocery orders for each autonomous robot vehicle.

In embodiments, the instructions, when executed by the one or more processors, cause the system to identify, based on equipment inventory and grocery inventory information in the database, particular autonomous vehicles in the fleet capable of fulfilling the grocery order.

In various embodiments, the equipment inventory information may indicate whether each autonomous robot vehicle includes a temperature controlled storage compartment.

In certain embodiments, the equipment inventory information may indicate whether each autonomous robot vehicle includes one or more of: a heater, a cooler, or both a heater and a cooler.

In some embodiments, the equipment inventory information may indicate whether each autonomous robot vehicle includes a humidity controlled storage compartment.

In embodiments, the instructions, when executed by the one or more processors, may further cause the system to travel to a different delivery location or to travel to the one or more storage locations.

According to yet another aspect, the present disclosure is directed to an autonomous robot vehicle system that includes a conveyance system, a navigation system configured to navigate to destinations, a communication system, one or more storage compartments, one or more temperature control modules, one or more processors, and a memory. The one or more storage compartments are configured to store grocery items of a grocery order for a destination. Each grocery item has a predetermined temperature requirement. The one or more temperature control modules are coupled to the one or more storage compartments and configured to maintain one or more temperatures in the one or more storage compartments within one or more predetermined temperature ranges. The memory stores instructions which, when executed by the one or more processors, cause the autonomous robot vehicle to, autonomously receive, via the communication system, the grocery order for the destination; determine, via the navigation system, a travel route that includes the destination; control the conveyance system to travel the travel route to reach the destination; and control, via the at least one temperature control module, one or more temperatures in the one or more storage compartments within the one or more predetermined temperature ranges based on the predetermined temperature requirements of the grocery order while traveling on the travel route.

In various embodiments, the instructions, when executed by the one or more processors, further cause the autonomous robot vehicle to: receive, via the communication system, one or more additional grocery orders; and coordinate with the one or more temperature control modules for concurrently controlling temperatures within the one or more storage compartments based on the grocery order and the one or more additional grocery orders.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
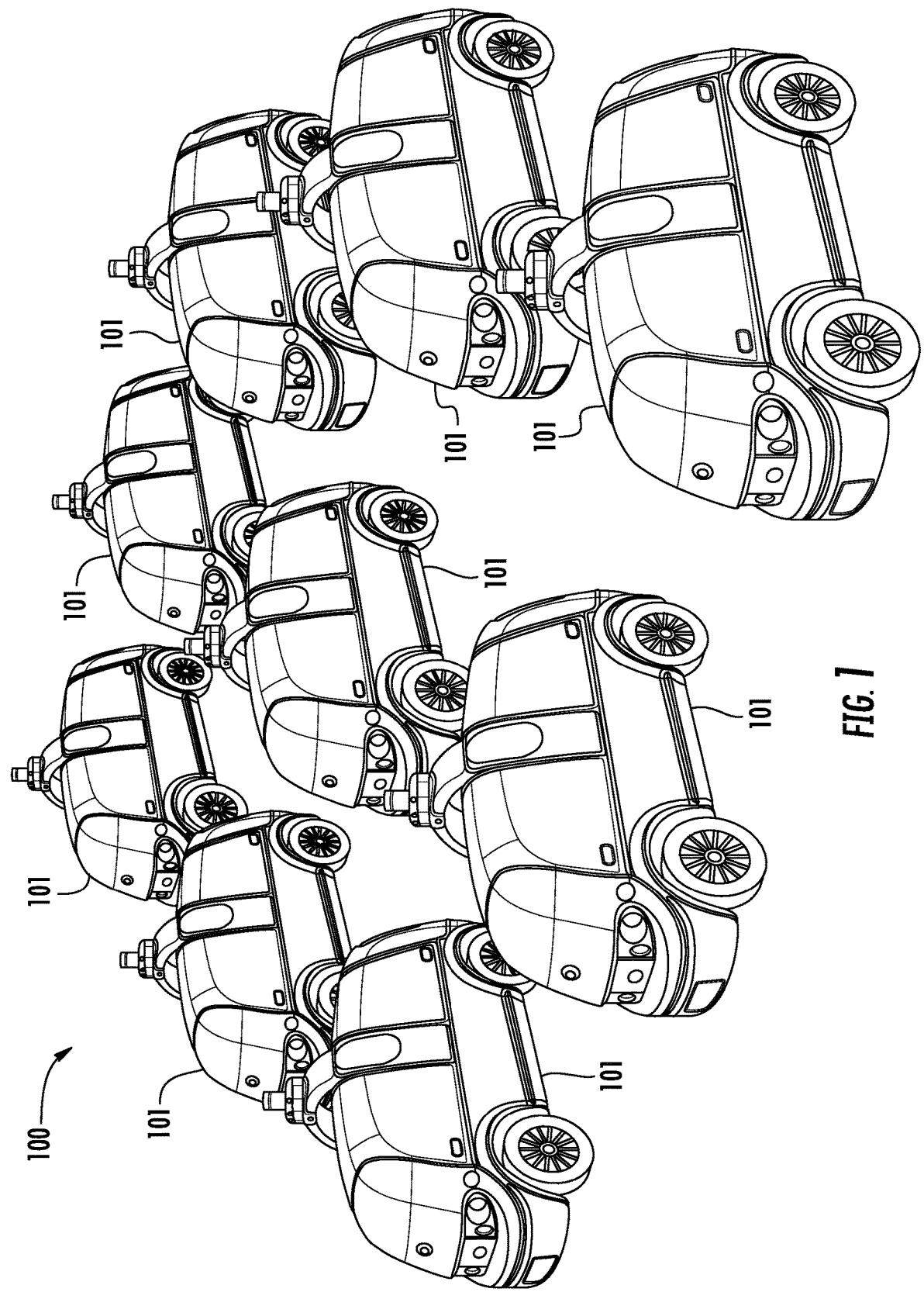
FIG. 1 is a perspective view of an autonomous robot fleet in accordance with the principles of the present disclosure.

This disclosure relates to a grocery delivery system including a fully-autonomous and/or semi-autonomous robot fleet and, in particular, to one or more robot vehicles for transporting or retrieving deliveries in either open unstructured outdoor environments or closed environments. In one aspect, the present disclosure provides systems and one or more autonomous vehicles for receiving orders for transporting grocery items to be delivered to delivery destinations, where the grocery items may be temperature and/or humidity controlled on the autonomous vehicles en route to the delivery destination (e.g., a customer home, office, warehouse, store, etc.). More specifically, the one or more autonomous vehicles include securable storage compartments for maintaining grocery items within predetermined temperature and/or humidity ranges to preserve the freshness/vigor of the grocery items while in transport between destinations.

As used herein, the term "grocery" includes perishable and non-perishable food and supplies/products such as produce, frozen foods, heated or warmed foods, refrigerated foods, wet foods, dry foods, canned foods, packaged foods, beverages, and the like, as well as related consumer products or merchandise such as medication, hygiene products, toys, electronics, pharmacy products, vitamins/supplements, gift cards, decorations, books, videos, balloons, containers, magazines, cards, clothes, pet supplies, cosmetics, flowers, office supplies, school supplies, cleaning supplies, kitchenware, dishware, utensils, laundry products, seasonal items, novelties, and/or other specialty items, etc.

Provided herein is a grocery delivery system including a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer or a customer group within a marketplace, or provider and provide entry when authorized, a communication module, a temperature control module, a humidity control module, and a processor configured to manage the conveyance system, the navigation module, the sensor system, the communication module, the temperature control module, the humidity control module, and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of mobile machines or vehicles including land vehicles, watercraft, and/or aircraft operating together or under the same ownership. In some embodiments, the fleet or sub-fleet is engaged in the same activity. In various embodiments, the fleet or sub-fleet are engaged in similar activities. In certain embodiments, the fleet or sub-fleet are engaged in different activities.

As used herein, the term "robot," "robot vehicle," "robot fleet," "vehicle," "all-terrain vehicle," "multi-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment," which may include a "sub-compartment," is used to indicate an internal bay of a robot vehicle. In embodiments, the compartment may have a dedicated door, for example, at the exterior of the vehicle for accessing the bay, or portions thereof, and/or interior of the vehicle for access the bay, or portions thereof. In various embodiments, compartment may indicate an insert secured within the bay, or portions thereof.

As used herein, the term "sub-compartment" is used to indicate a subdivision or portion of a compartment.

As used herein, the term "user," "operator," "fleet operator," "manager," and like terms are used to indicate the entity that owns or is responsible for managing and/or operating the robot fleet, or portions thereof.

As used herein, the term "customer" and like terms are used to indicate the entity that requests the services provided by the robot fleet.

As used herein, the term "provider," "business," "vendor," "third party vendor," and like terms are used to indicate an entity that works in concert with the fleet owner or operator to utilize the services of the robot fleet to deliver the provider's product from, and/or return the provider's product to, the provider's place of business or staging/storing location.

As used herein, the term "server," "computer server," "central server," "main server," and like terms are used to indicate a computer or device on a network that manages the fleet resources, namely the one or more of the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein, the controller is commonly used for managing access to components of the robot such as the securable storage compartments.

As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein, the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each vehicle 101 operating fully-autonomously (e.g., unmanned) or semi-autonomously. In some embodiments, the robot fleet 100 is fully-autonomous. In some embodiments, the robot fleet 100 is semi-autonomous.

Figure 2:
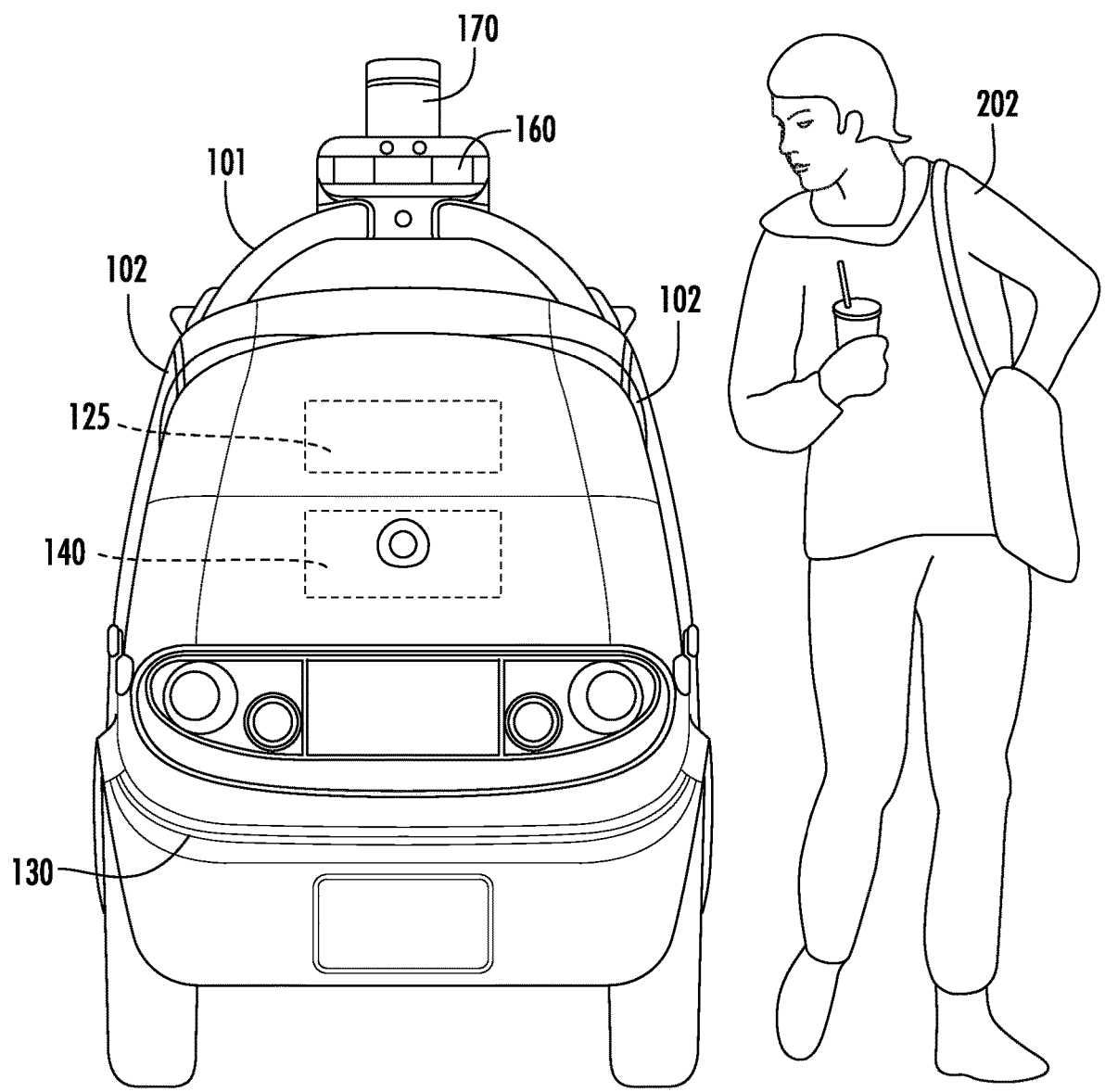
FIG. 2 is an front view of a robot vehicle of the autonomous robot fleet of FIG. 1 shown adjacent to an individual customer of average height.
Figure 3:
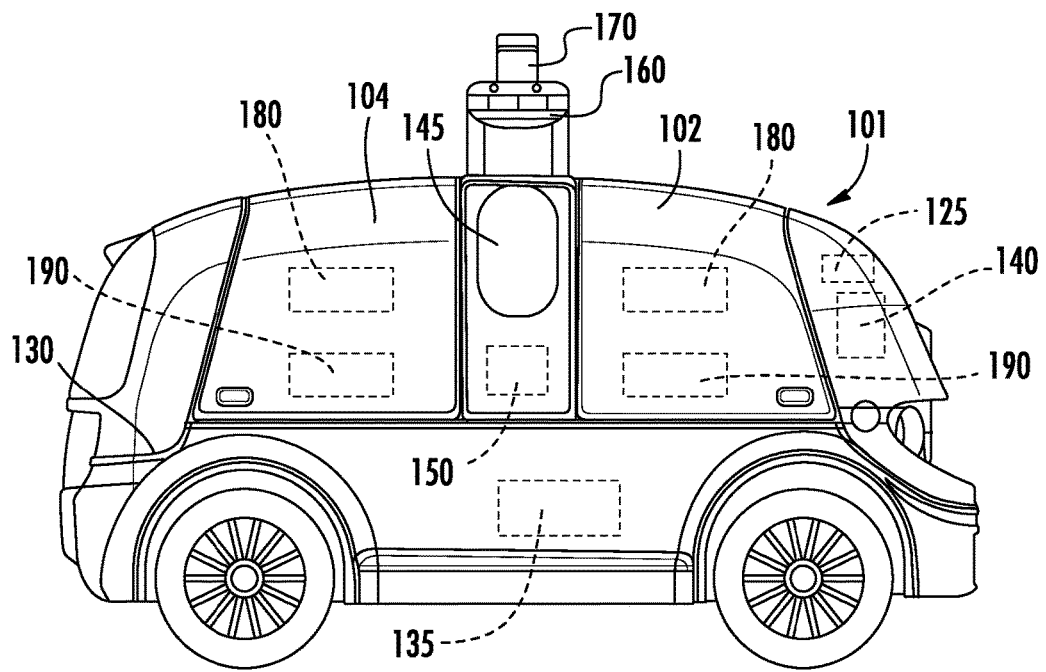
FIG. 3 is a right, side view of the robot vehicle of FIG. 2.
Figure 4:
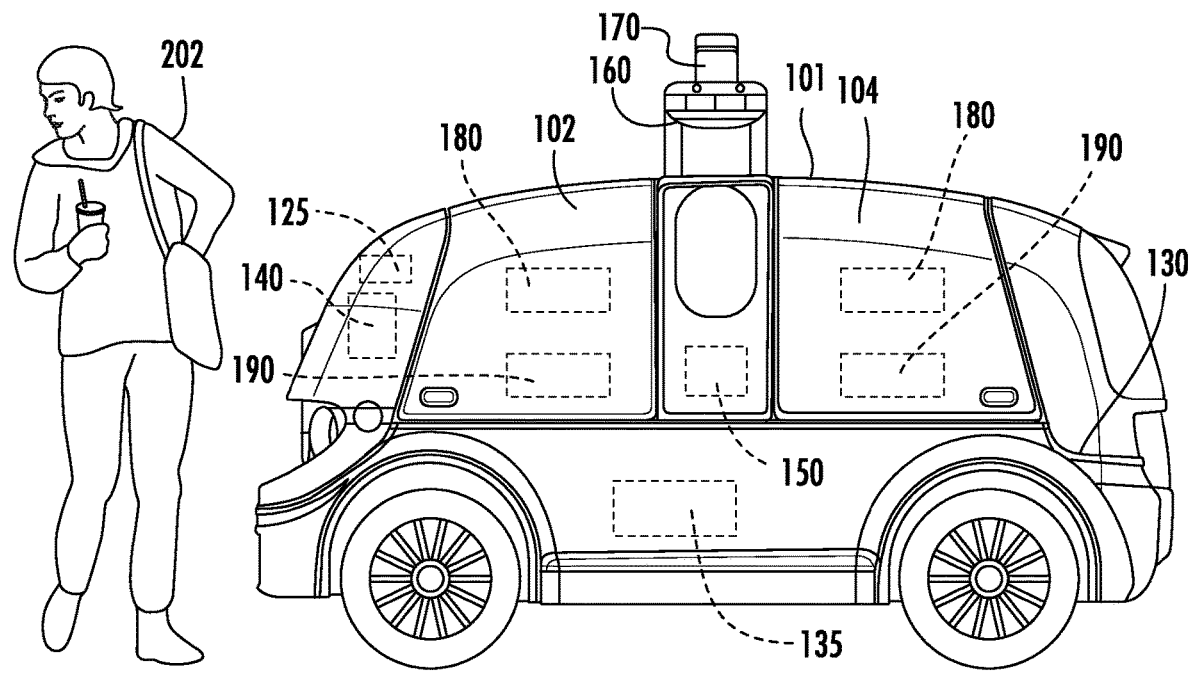
FIG. 4 is a left, side view of the robot vehicle of FIG. 2 shown adjacent to the individual customer of average height seen in FIG. 2.

As illustrated in FIGS. 2-4, one exemplary configuration of a robot 101 is a vehicle configured for land travel, such as a small fully-autonomous (or semi-autonomous) automobile. The exemplary robot 101 is narrow (e.g., 2-5 feet wide), low mass and low center of gravity for stability, having multiple secure storage compartments 102, 104 assignable to one or more customers, retailers and/or vendors, and designed for moderate working speed ranges (e.g., up to 45.0 mph) to accommodate inner-city and residential driving speeds. Additionally, in some embodiments, the robots 101 in the fleet are configured with a maximum speed range up to about 90.0 mph for high speed, intrastate or interstate driving. Each robot 101 in the fleet is equipped with a sensor system 170 include any number of onboard sensors such as cameras (e.g., running at a high frame rate, akin to video), LiDAR, radar, ultrasonic sensors, microphones, etc. and internal computer processing to constantly determine where it can safely navigate, what other objects are around each robot 101 and what it may do.

In some embodiments, it may be necessary to have communication between one or more robots 101, a fleet operator/manager 200, a provider 204 and/or a customer 202 to address previously unforeseen issues (e.g., a malfunction with the navigation module; provider inventory issues; unanticipated traffic or road conditions; or direct customer interaction after the robot arrives at the customer location).

In some embodiments, the robot fleet 100 is controlled directly by the fleet manager 200. In some embodiments, it may be necessary to have direct human interaction between the customer 202 and the fleet operator 200 (e.g., through robot 101) to address maintenance issues such as mechanical failure, electrical failure or a traffic accident (see FIG. 7).

In some embodiments, the robot fleet 100 is configured for land travel. In some embodiments, each robot vehicle 101 in the fleet 100 is configured with a working speed range from 13.0 mph to 45.0 mph. In some embodiments, the robot vehicles 101 in the fleet 100 are configured with a maximum speed range from 13.0 mph to about 90.0 mph.

In some embodiments, the robot fleet 100 is configured for water travel as a watercraft and is configured with a working speed range from up to 45.0 mph.

In some embodiments, the robot fleet 100 is configured for hover travel as an over-land or over-water hovercraft and is configured with a working speed range up to 60.0 mph.

In some embodiments, the robot fleet 100 is configured for air travel as an aerial drone or aerial hovercraft and is configured with a working speed range up to 80.0 mph.

In some embodiments of the robot fleet 100, the autonomous robots 101 within the fleet 100 are operated on behalf of third party vendor/service provider. For example, a fleet management service is established to provide a roving delivery service for a third party grocery provider (e.g., an ice cream service/experience for a third party vendor (e.g., Haagen-Dazs®)). It is conceived that the fleet management service would provide a sub-fleet of "white label" vehicles carrying the logo and products of that third party grocery provider to operate either fully-autonomously or semi-autonomously to provide this service.

In some embodiments of the robot fleet 100, the autonomous robots 101 within the fleet 100 are further configured to be part of a sub-fleet of autonomous robots 101, and each sub-fleet is configured to operate independently or in tandem with multiple sub-fleets having two or more sub-fleets.

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet 100 is controlled directly by the manager 200.

In some embodiments, there will likely be times when a vehicle breaks down, has an internal system or module failure or is in need of maintenance. For example, in the event that the navigation module should fail, each robot 101 within the fleet 100 is configurable to allow for direct control of the robot's processor to override the conveyance and sensor systems (e.g., cameras, etc.) by a fleet operator 200 to allow for the safe return of the vehicle 101 to a base station for repair or maintenance.

The Operating Environments

In some embodiments, the unstructured open environment is a non-confined geographic region accessible by navigable pathways, including, for example, public roads, private roads, bike paths, open fields, open public lands, open private lands, pedestrian walkways, oceans, lakes, rivers, streams, airways, etc.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

Figure 5:
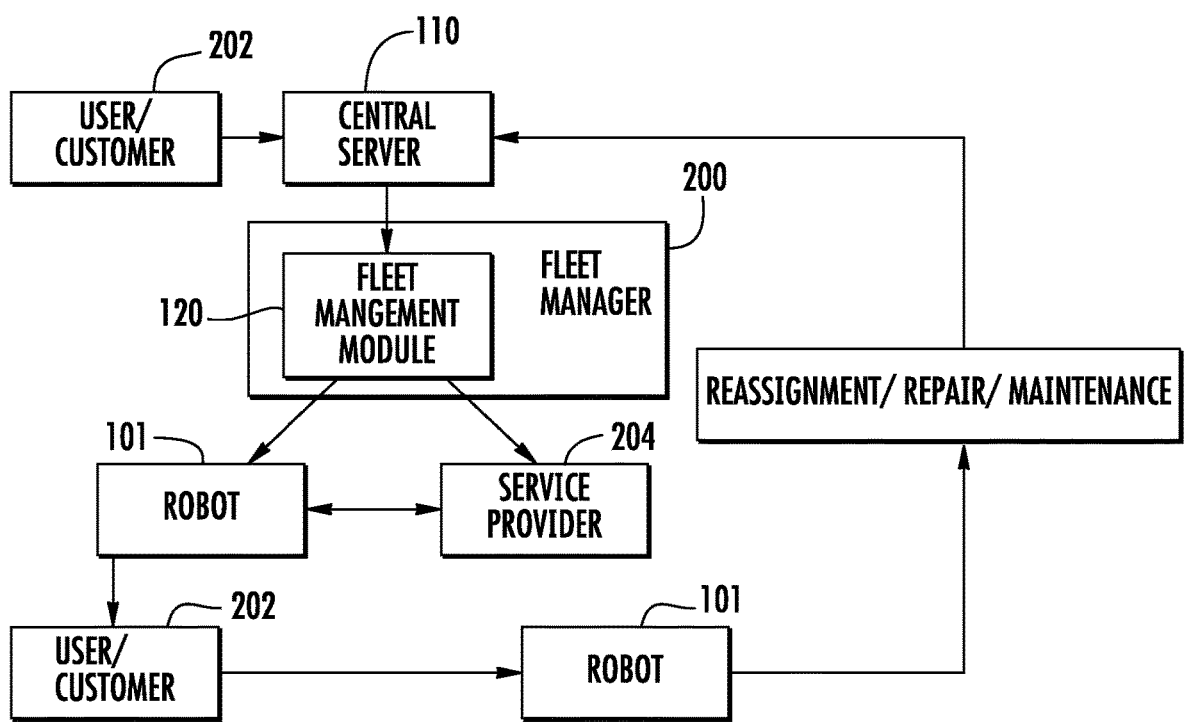
FIG. 5 is an exemplary flowchart representation of logic flow for a fleet management control module associated with a central server for the autonomous robot fleet of FIG. 1.

With reference to FIG. 5, in some embodiments of the robot fleet 100, the fleet 100 includes a fleet management module 120 (associated with a central server 110) for coordination of the robot fleet 100 and assignment of tasks for each robot 101 in the fleet 100. The fleet management module 120 coordinates the activity and positioning of each robot 101 in the fleet 100. In addition to communicating with the robot fleet 100, fleet operator 200, the fleet management module 120 also communicates with providers/vendors/businesses 204 and customers 202 to optimize behavior of the entire system.

The fleet management module 120 works in coordination with a central server 110, typically located in a central operating facility owned or managed by the fleet operator 200.

With continued reference to FIG. 5, in one embodiment, a request is sent to a main server 110 (typically located at the fleet manager's location), which then communicates with the fleet management module 120. The fleet management module 120 then relays the request to the appropriate provider 204 of the service (e.g., grocery store, warehouse, vendor, retailer, etc.) and an appropriate robot or robots 101 in the fleet 100. The most appropriate robot(s) 101 in the fleet 100 within the geographic region, and which may be closest to the service provider 204, is then assigned the task. The service provider 204 then interacts with that robot 101 at their business (e.g., loading it with goods, if needed). The robot 101 then travels to the customer 202 and the customer 202 interacts with the robot 101 to retrieve their goods or service (e.g., the grocery items ordered). An interaction can include requesting the robot 101 to open its compartment(s) 102, 104 through the customer's app or through a user interface on the robot itself 145 (using, e.g., RFID reader and customer phone, a touchpad, a keypad, voice commands, vision-based recognition of the person, etc.) (see FIGS. 3 and 4). Upon completion of the delivery (or retrieval, if appropriate), the robot 101 reports completion of the assignment and reports back to the fleet management module 120 for re-assignment (e.g., to another grocery order), repair, and/or maintenance (e.g., to a base station or repair shop).

Figure 6:
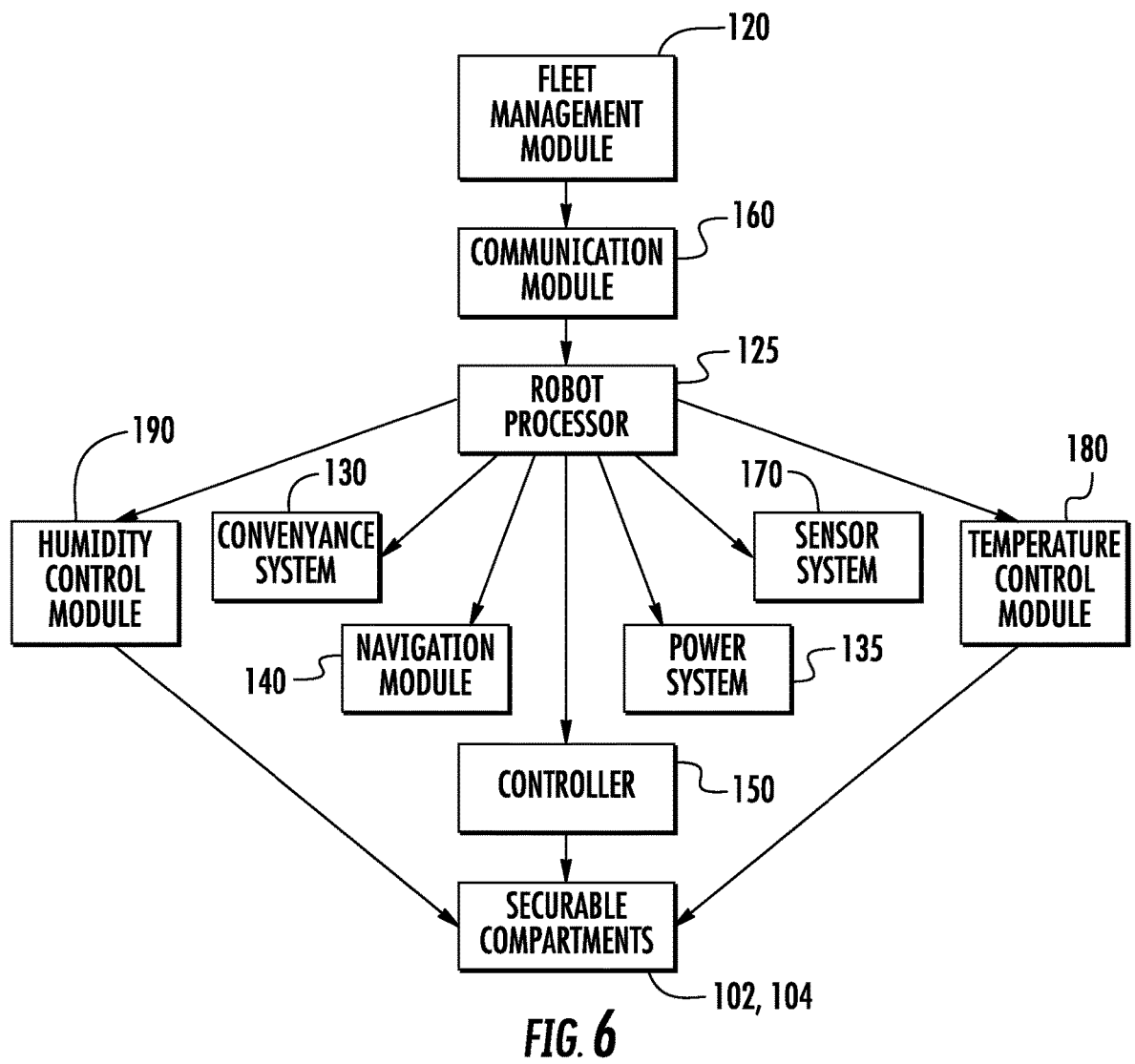
FIG. 6 is an exemplary flowchart representation of logic flow from the fleet management control module of FIG. 5 through a robot processor of the robot vehicle of FIG. 2 to various systems and modules of the robot vehicle of FIG. 2.

As further illustrated in FIG. 6, and previously noted, in some embodiments, the fleet management module 120 handles coordination of the robot fleet 100 and assignment of tasks for each robot 101 in the fleet 100. The fleet management module 120 coordinates the activity and positioning of each robot 101 in the fleet 100. The fleet management module 120 also communicates with vendors/businesses 204 and customers 202 to optimize behavior of the entire system. It does this by utilizing the robot's processor 125 to process the various inputs and outputs from each of the robot's systems and modules, including: the conveyance system 130, the power system 135, the navigation module 140, the sensor system 170, the communication module 160, the controller 150, the temperature control module 180, and/or the humidity control module 190 to effectively manage and coordinate the various functions of each robot 101 in the fleet 100.

In some embodiments, the robot 101 may be requested for a pick-up of an item (e.g., a grocery item or document such as a receipt) with the intent of delivery to another party. In this scenario, the fleet management module 120 would assign the robot 101 to arrive at a given location, assign a securable storage compartment for receiving the item, confirm receipt from the first party to the fleet management module 120, then proceed to the second location where an informed receiving party would recover the item from the robot 101 using an appropriate PIN or other recognition code to gain access to the secure storage compartment. The robot 101 would then report completion of the assignment and report back to the fleet management module 120 for re-assignment.

In accordance with aspects of the present disclosure, the central server 110 and/or the fleet management module 120 can include or can be part of a grocery delivery system (e.g., for managing the fleet 100).

Conveyance Systems

Each robot vehicle 101 in the fleet 100 includes a conveyance system 130 (e.g., a drive system with a propulsion engine, wheels, treads, wings, rotors, blowers, rockets, propellers, brakes, etc.).

As noted previously, the robot fleet 100 is configurable for land, water, and/or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot 101 could be configured with an auxiliary solar power system to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet 100 is configured for water travel as a watercraft with a propulsion system (engine) that is configurable as a gas engine, a turbine engine, an electric motor and/or a hybrid gas/electric engine and is further configured with a propeller.

In some embodiments, the robot fleet 100 is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet 100 is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot 101 of the robot fleet 100 is configured with one or more power sources, which include a power system 135 (e.g., battery, solar, gasoline, propane, etc.).

Navigation Module

Each robot 101 in the fleet 100 further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot 101 is configured to operate. These maps would then be used for general guidance of each robot 101 in the fleet 100, which would augment this understanding of the environment by using sensor system 170, which can include a variety of on-board sensors such as cameras, LiDAR, altimeters or radar to confirm its relative geographic position and elevation.

In some embodiments, for navigation, the fleet 100 of robots 101 uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet 100 incorporates on-line maps to augment internal maps. This information is then combined to determine a safe, robust trajectory for the robot 101 to follow and this is then executed by the low level actuators on the robot 101.

In some embodiments, the fleet 100 relies on a global positioning system (GPS) that allows land, sea, and airborne users to determine their exact location, velocity, and time 24 hours a day, in all weather conditions, anywhere in the world.

In some embodiments, the fleet 100 of robots 101 will use a combination of internal maps, sensors and GPS systems to confirm its relative geographic position and elevation.

In some embodiments, the autonomous fleet 100 is strategically positioned throughout a geographic region in anticipation of a known demand.

Over time, a fleet operator 200 and/or a vendor 204 can anticipate demand for robot services by storing data concerning how many orders (and what type of orders) are made at particular times of day from different areas of the region. This can be done for both source (e.g., grocery stores, restaurants, warehouses, general businesses, etc.) and destination (e.g., customer, other businesses, etc.). Then, for a specific current day and time, this stored data is used to determine what the optimal location of the fleet 100 is given the expected demand. More concretely, the fleet 100 can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet 100 so that the fleet 100 optimally covers the weighted locations based on these numbers.

In some embodiments of the robot fleet 100, the positioning of robots 101 can be customized based on: anticipated use, a pattern of historical behaviors, or specific goods being carried.

Sensor Systems

As noted previously, each robot 101 is equipped with a sensor system 170, which includes at least a minimum number of onboard sensors such as cameras (for example, those running at a high frame rate akin to video), LiDAR, radar, ultrasonic sensors, microphones, etc.) and internal computer processing 125 to constantly determine where it can safely navigate, what other objects are around each robot 101, and what it may do within its immediate surroundings.

In some embodiments, sensor system 170 includes sensors for conveyance system 130 configured to: monitor drive mechanism performance (e.g., the propulsion engine); monitor power system 135 levels (e.g., battery, solar, gasoline, propane, etc.); or monitor drive train performance (e.g., transmission, tires, brakes, rotors, etc.).

Communications Module

Figure 7:
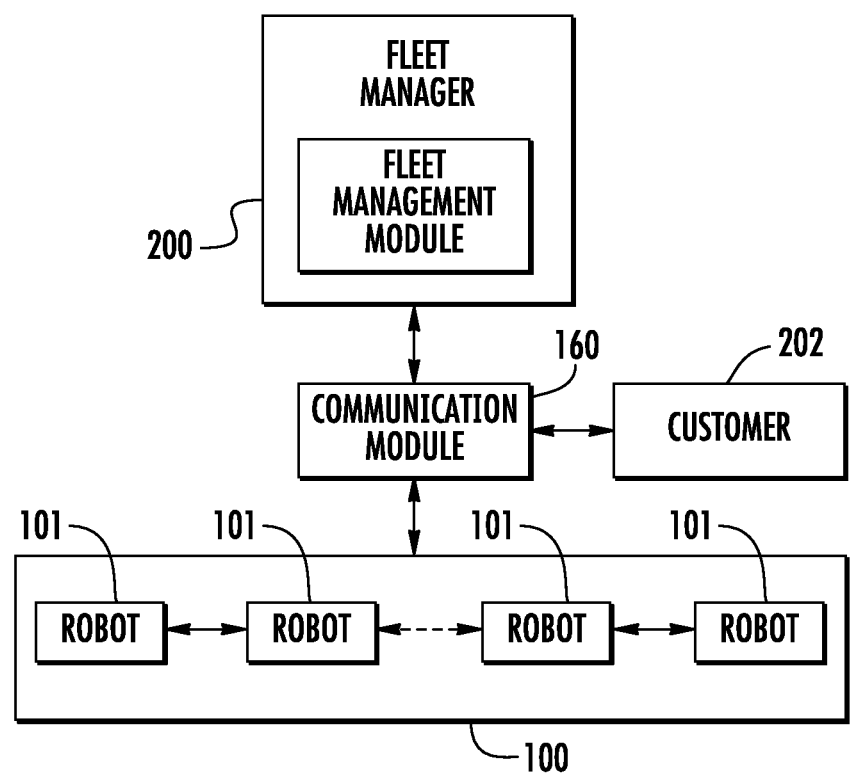
FIG. 7 is an exemplary flowchart representation of logic flow through a communications module of an autonomous vehicle system.

With reference to FIG. 7, each robot 101 in the fleet 100 further includes a communication module 160 configurable to receive, store and send data to the fleet management module 120, to a user, to and from the fleet management module 120, and to and from the robots 101 in the fleet 100. In some embodiments, the data is related to at least operator 200 interactions and the robot fleet 100 interactions, including, for example, scheduled requests or orders, on-demand requests or orders, or a need for self-positioning of the robot fleet 100 based on anticipated demand within the unstructured open or closed environments.

In some embodiments, each robot 101 in the fleet 100 includes at least one communication module 160 configurable to receive, store and transmit data, and to store that data to a memory device 514 (see FIG. 13), for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, communication to the operator 200 and the robots 101 in the fleet 100, between the robots 101 of the fleet 100, and between the operator 200 and the robots 101 in the fleet, occurs via wireless transmission.

In some embodiments, the operator's 200 wireless transmission interactions and the robot fleet 100 wireless transmission interactions occur via mobile application transmitted by an electronic device (e.g., cell phone, tablet, etc.) and forwarded to the communication module via: a central server 110, a fleet management module 120, and/or a mesh network.

In some embodiments, one preferred method of communication is to use cellular communication between the fleet manager 200 and fleet 100 of robots 101, (e.g., 3G, 4G, 5G, or the like). Alternatively, the communication between the fleet control module 120 and the robots 101 could occur via satellite communication systems.

In some embodiments, a customer 202 uses an app (either on a cellphone, laptop, tablet, computer or any interactive device) to request a service (e.g., an on-demand grocery order or for a mobile marketplace robot to come to them such as for returning a grocery item, for example).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the operator 200 includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar groceries within the same interaction (e.g., signed documents), the user receiving one set of groceries and returning a different set of groceries within the same interaction (e.g., grocery replacement/returns, payment transactions, etc.), a third party user providing instruction and or authorization to a goods or service provider to prepare, transport, deliver and/or retrieve groceries to a principle user in a different location.

In some embodiments, the services further include: advertising services, land survey services, patrol services, monitoring services, traffic survey services, signage and signal survey services, architectural building or road infrastructure survey services.

In some embodiments, at least one robot 101 is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots 101 within the fleet 100 are equipped for financial transactions. These can be accomplished using known transaction methods such as debit/credit card readers or the like.

In accordance with aspects of the present disclosure, when the robot fleet 100 is configured as a roving fleet, such robot vehicles 101 can reduce the wait time from customer order to delivery.

Securable Compartments

Figure 8:
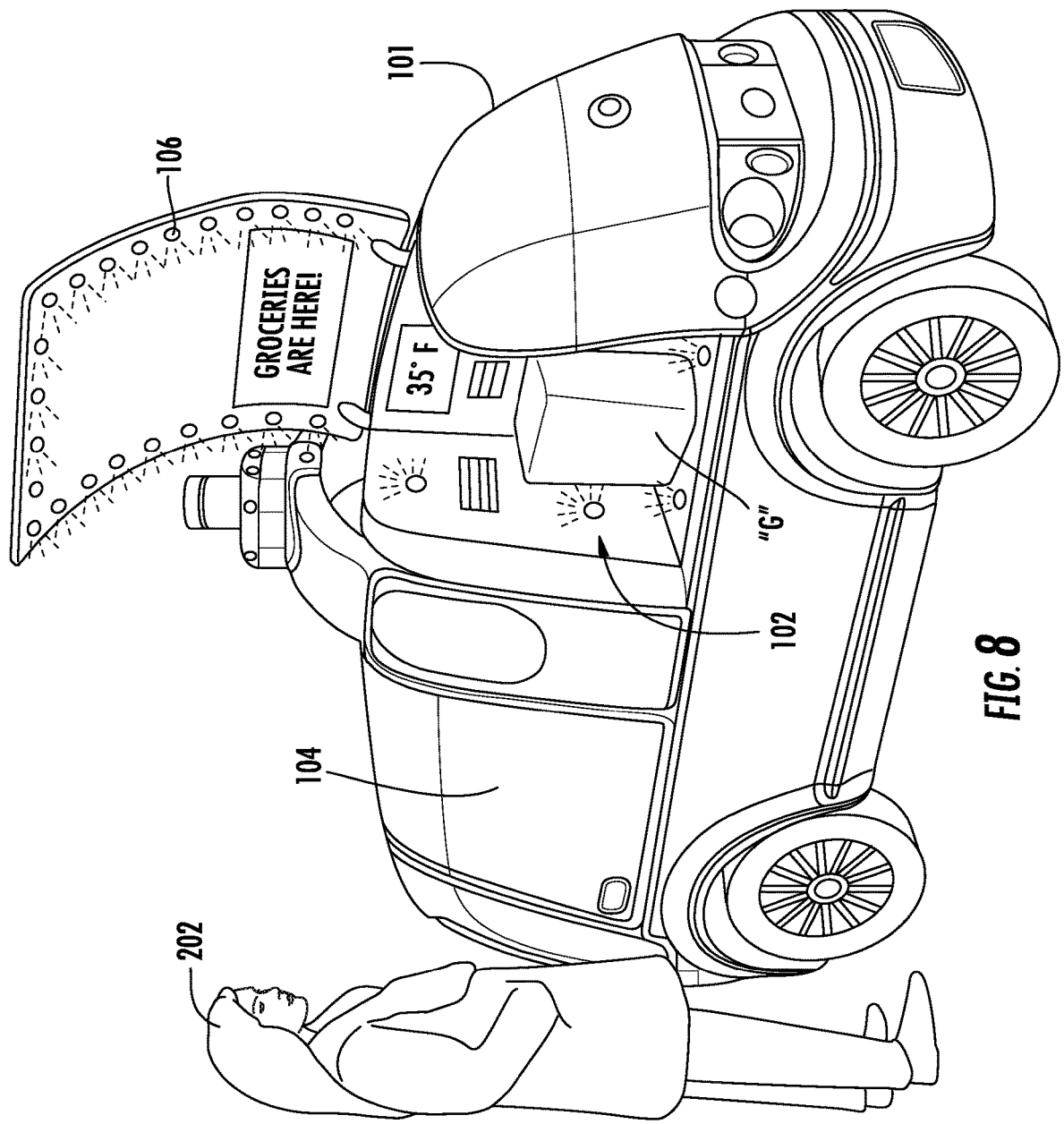
FIG. 8 is an exemplary perspective view of an embodiment of the robot vehicle of FIG. 2 delivering grocery items to a customer.
Figure 9:
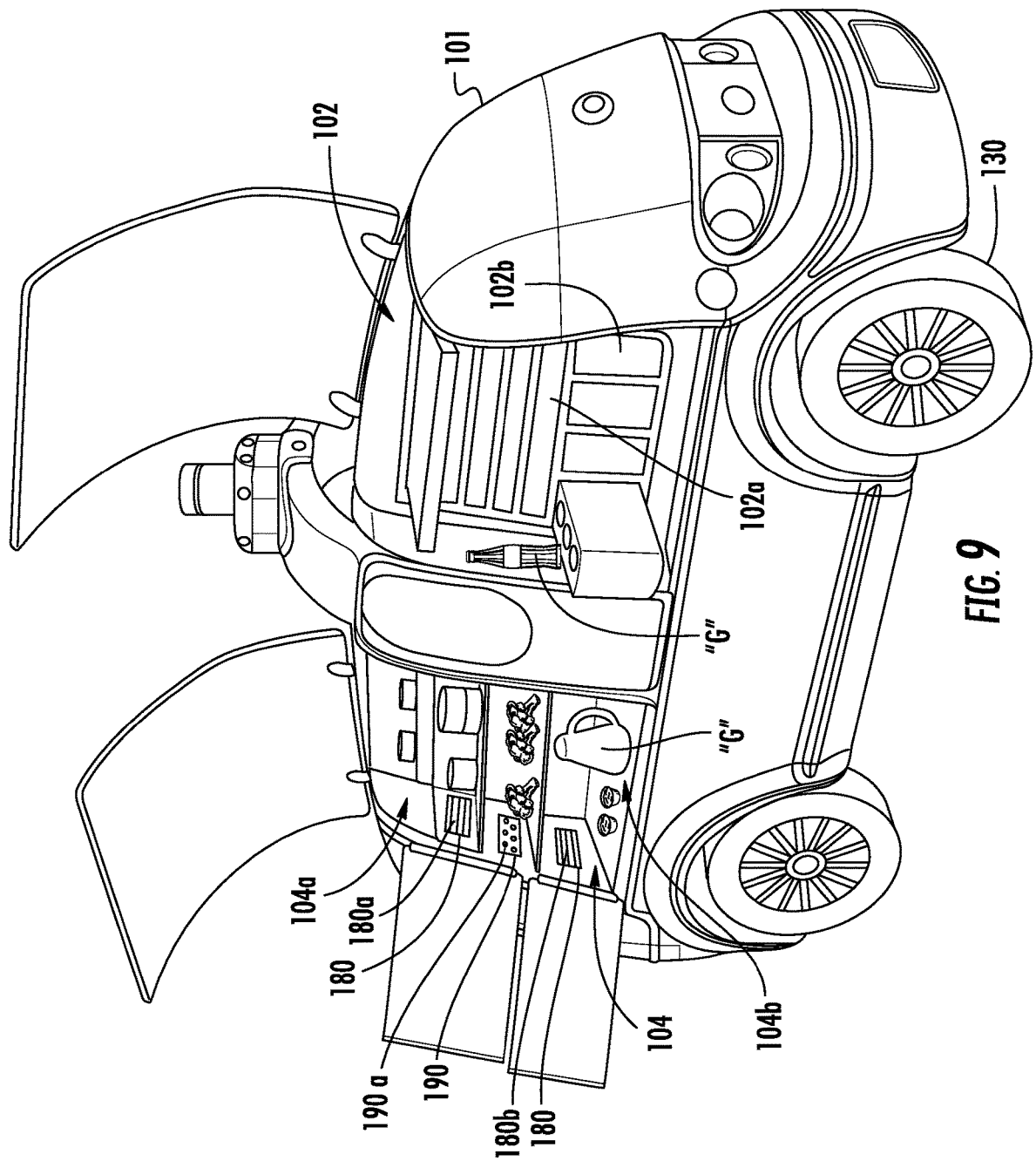
FIG. 9 is an exemplary perspective view of another embodiment of the robot vehicle supporting grocery items in various compartments of the robot vehicle.

As illustrated in FIGS. 8 and 9, robots 101 in the fleet 100 are each configured for transporting, delivering or retrieving goods or services and are capable of operating in an unstructured open environment or closed environment. In some embodiments, the vehicle 101 is configured to travel practically anywhere (e.g., land, water, air, etc.). Vehicle includes two large storage compartments 102, 104 on each side of the vehicle 101, but may include any number of compartments. Large storage compartments 102, 104 can include any number of smaller internal secure storage compartments of various configurations such as compartments 102a, 102b, 104a, 104b, respectively, for carrying individual items that are to be delivered to, or need to be retrieved from customers 202. The internal secure compartments 102a, 102b, 104a, 104b, may also be referred to herein as sub-compartments. Additionally, within the context of descriptions relating to compartments and sub-compartments, the term "module" may be used herein to refer to a compartment and/or a sub-compartment.

In embodiments, one or more of compartments 102, 104, or respective sub-compartments 102a, 102b, 104a, 104b, may include, or be operatively coupled to a temperature control module 180 and/or a humidity control module 190 so that one or more of the securable storage compartments are humidity and/or temperature controlled for maintaining grocery items within predetermined temperature and/or humidity ranges to preserve the freshness/vigor of the grocery items while in transport between destinations. Temperature control module 180 and/or humidity control module 190 can include any suitable heating devices, cooling devices, and/or humidifying/dehumidifying devices for controlling the temperature and/or humidity of grocery items "G." For instance, one compartment (e.g., 104a) may include a heater 180a for heating grocery item "G" within that compartment, while another compartment (e.g., 104b) includes a cooler 180b for cooling (refrigeration and/or freezing) grocery item "G" within that compartment. In one example, a compartment 104c may include a humidifier (or dehumidifier) 190a for humidifying (or dehumidifying the grocery items "G" within that compartment. Such technology can include any suitable mechanical, electrical, and/or chemical components (e.g., vents, coils, fluids, compressors, pipes, controllers, gas, water, valves, nozzles, pumps, tanks, burners, lamps, wires, fans, transducers, wicks, fans, etc.). In embodiments, temperature and/or humidity can be autonomously and/or manually adjusted based on the type and quantity of groceries and various grouping of groceries. In certain embodiments, the vehicle 101 may include one or more sensors, such as in the compartments, to determine various data such as types, temperatures and humidity of the groceries and/or ambient air in the various compartments. In some embodiments, the data can be compared or contrasted with historical or real-time data stored in memory or on the network to determine the most effective and/or efficient manner in which to control temperatures and/or humidity of the groceries and/or ambient air within the compartments.

In certain embodiments, one or more of the compartment(s) may include compartment lighting 106 (e.g., for night deliveries).

In some embodiments, the securable compartments are variably configurable based on: anticipated demands, patterns of behaviors, area of service, or types of goods to be transported.

Referring again to FIG. 6, each robot 101 includes securable storage compartments 102, 104 to hold grocery items, and a controller 150 configurable to associate each one of the securable compartments 102, 104 to an assignable customer 202 or provider 204 and provide entry when authorized. Each robot vehicle 101 further includes at least one processor 125 configured to manage the conveyance system 130, the navigation module 140, the sensor system 170, instructions from the fleet management module 120, the communication module 160, the temperature control module 180, the humidity control module 190, and the controller 150.

As described previously, each robot 101 is configured with securable storage compartments 102, 104. Alternately, a robot 101 is configurable to contain a set of goods or even a mobile marketplace (similar to a mini bar at a hotel).

When a robot is assigned to a customer 202, one or more of the compartments 102, 104 is also assigned to that customer 202. Each of the large compartments 102, 104 is secured separately and can securely transport groceries to a separate set of customers 202.

Upon arrival of the robot 101 to the customer destination, the customer 202 can then open their respective compartment(s) by verifying their identity with the robot 101. This can be done through a wide variety of approaches comprising, but not limited to:
1. The customers can be given a PIN (e.g., 4 digit number) when they make their initial request/order. They can then enter this pin at the robot using the robot touchscreen or a keypad.
2. The customers can verify themselves using their mobile phone and an RFID reader on the robot.
3. The customers can verify themselves using their voice and a personal keyword or key phrase they speak to the robot.
4. The customers can verify themselves through their face, a government ID, or a business ID badge using cameras and facial recognition or magnetic readers on the robot.
5. The customers can verify themselves using their mobile phone; by pushing a button or predetermined code on their phone (and the system could optionally detect the customer is near the robot by using their GPS position from phone)

In accordance with aspects of the present disclosure, the robot vehicles 101 can be configured to carry grocery items and to autonomously control temperature and/or humidity ranges within the compartments 102, 104. In various embodiments, the robot vehicle 101 includes a storage compartment or sub-compartment, such as a refrigeration compartment or sub-compartment, a freezer compartment or sub-compartment, a temperature controlled storage compartment or sub-compartment, and/or a humidity controlled storage compartment or sub-compartment. For ease of explanation below, a compartment or sub-compartment can be referred to as a module.

Figure 10A:
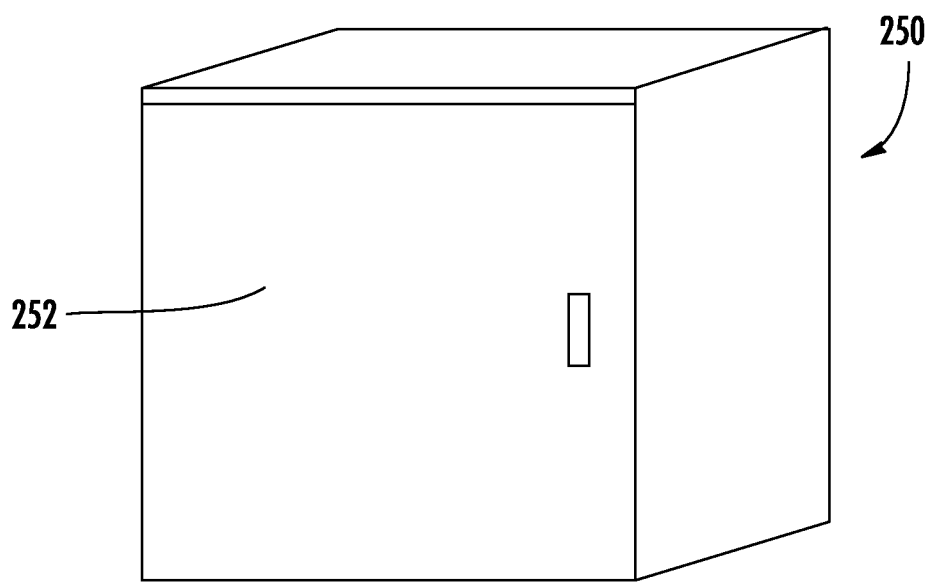
FIG. 10A is an exemplary perspective view of an embodiment of a storage module for the robot vehicle of FIG. 2 with a door thereof in a closed position.
Figure 10B:
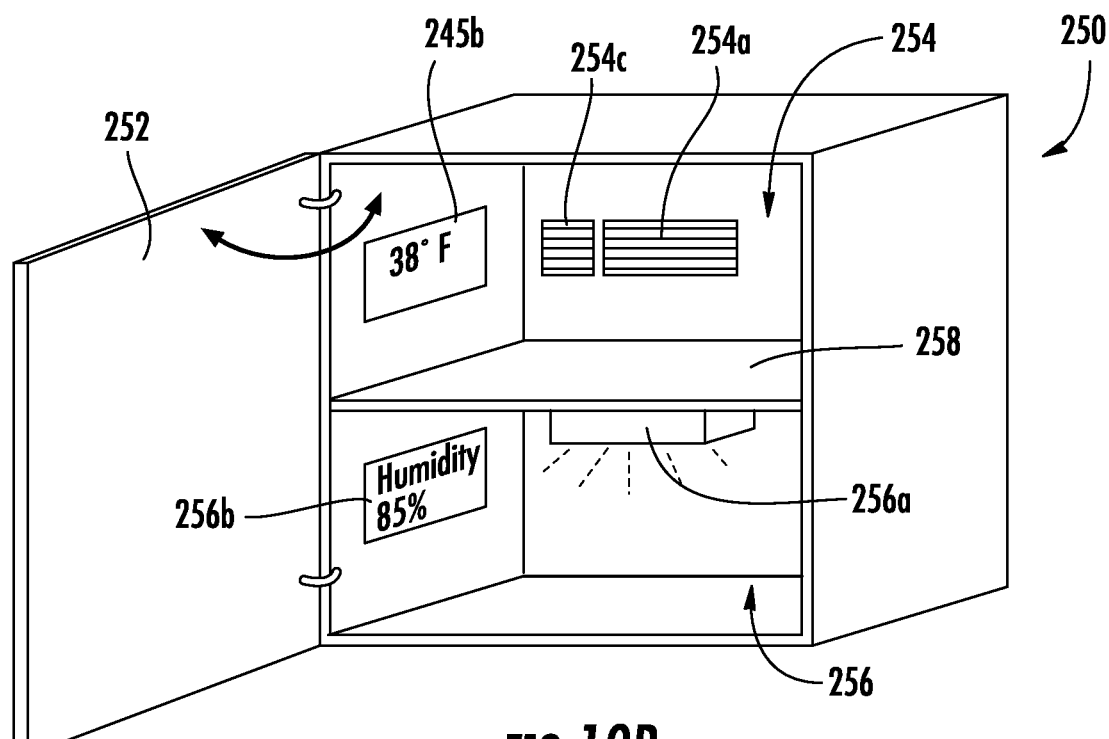
FIG. 10B is an exemplary perspective view of the storage module of FIG. 10 with the door thereof shown in an open position and illustrating a compartment within the storage module with a temperature control module and a compartment within the storage module with a humidity control module.

FIGS. 10A and 10B show one embodiment of a storage module 250 positionable within one or more of the compartments 102, 104. In embodiments, storage module 250 may be wholly, or partially replaceable. Storage module 250 includes a selectively openable door 252, a first compartment 254 that is temperature controlled, as indicated by temperature display 254b, and a second compartment 256 that is humidity controlled, as indicated by humidity display 256b. First and second compartments 254, 256 are separated by a shelf 258. First compartment 254 further includes a cooler 254a and/or heater 254c and the temperature display 254b, each of which can be part of, and/or operatively coupled to temperature control module 180 (FIG. 6) and/or together. Similarly, second compartment 256 includes humidity display 256b and a humidifier and/or dehumidifier 256a that are operatively coupled to humidity control module 190 (FIG. 6) and/or together. Humidity control module 190 and temperature control module 180, or components thereof, may be operatively coupled together. As can be appreciated, any number of these type compartments can include one, both, or neither of the humidity and/or temperature control modules 190, 180, or components thereof.

Figure 11:
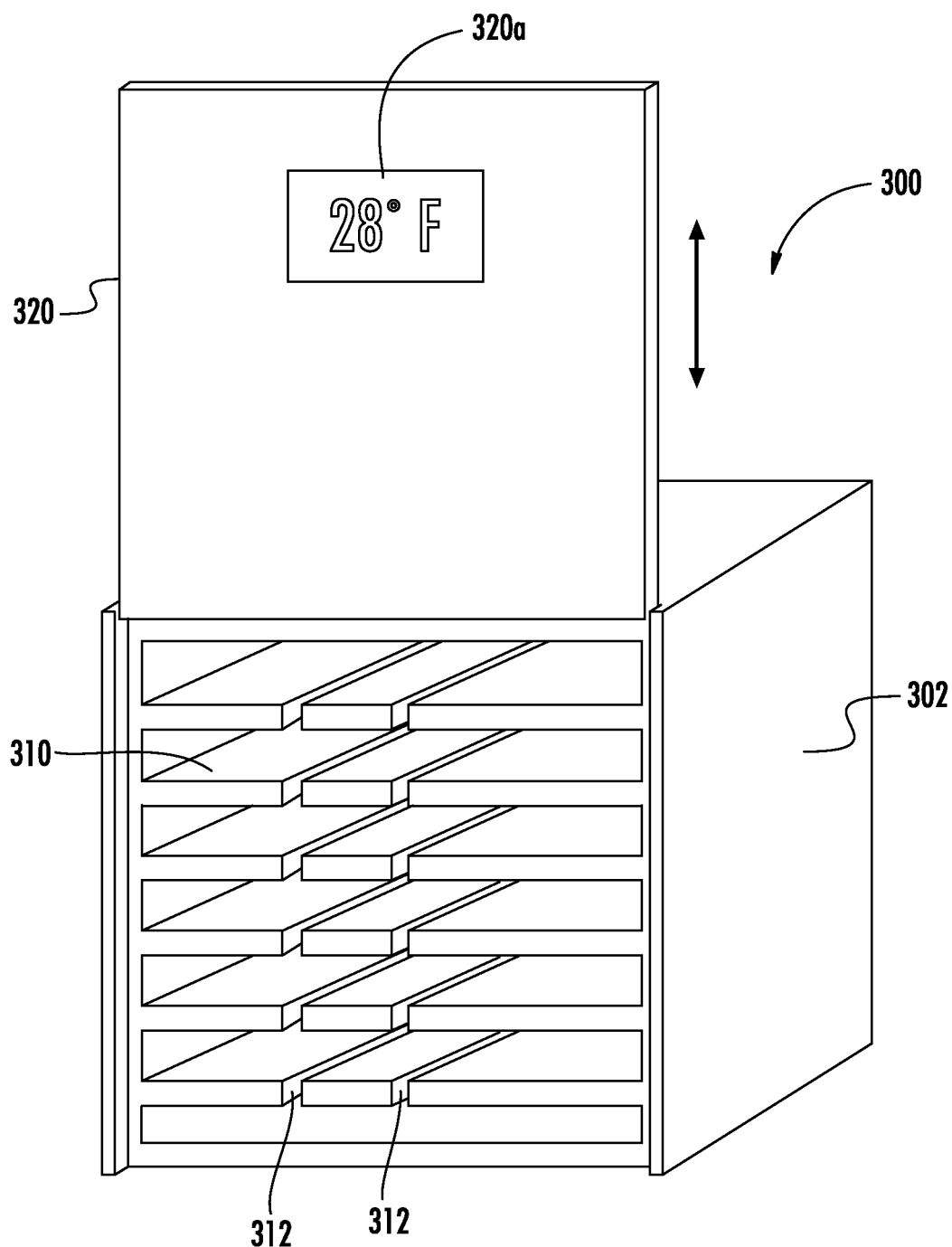
FIG. 11 is an exemplary perspective view of another storage module for the robot vehicle of FIG. 2.

FIG. 11 shows another embodiment of a storage module 300 which may be temperature controlled. The module 300 can include a sliding door 320 that opens and closes the module 300. FIG. 11 shows the sliding door 320 in an open position. When the sliding door 320 is the open position, groceries within the module 300 (e.g., pizza pies) are accessible and can be removed from the module 300.

In various embodiments, the storage modules may include temperature control modules that are configured to provide heat within the storage module up to about 500 degrees Fahrenheit. In certain embodiments, the storage modules may include a temperature control module configured to cool the storage module between about 32 and about 40 degrees Fahrenheit (e.g., refrigeration temperatures) and/or 32 degrees Fahrenheit and below (e.g., freezing temperatures). Other types and configurations of temperature controlled modules are contemplated for storing and preserving various types of grocery items. Any of the presently disclosed modules may be fully or partially insulated, or not insulated at all.

Controller(s) and Processor(s)

Figure 12:
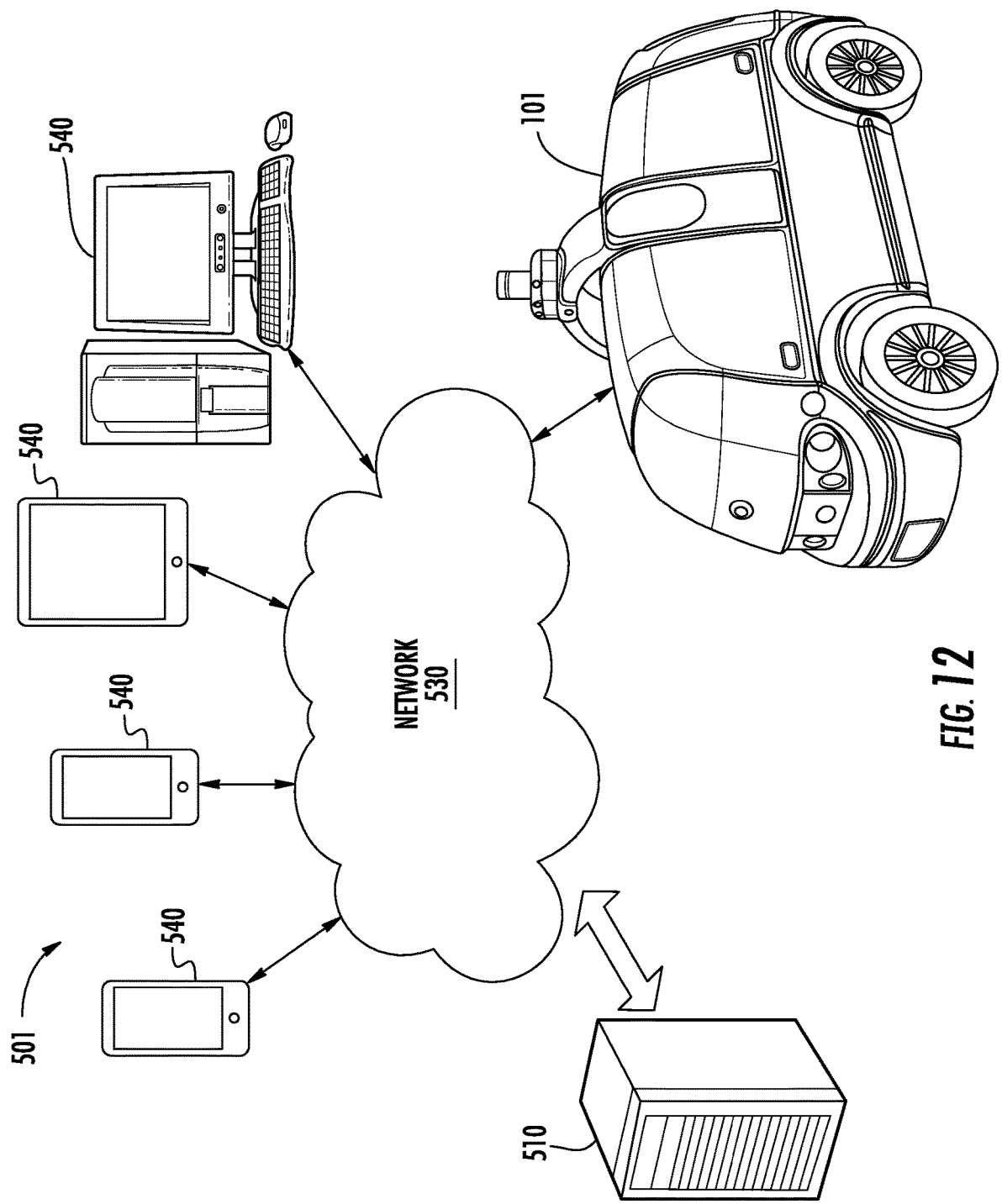
FIG. 12 is a diagram of an exemplary networked environment of an autonomous vehicle system of the present disclosure.
Figure 13:
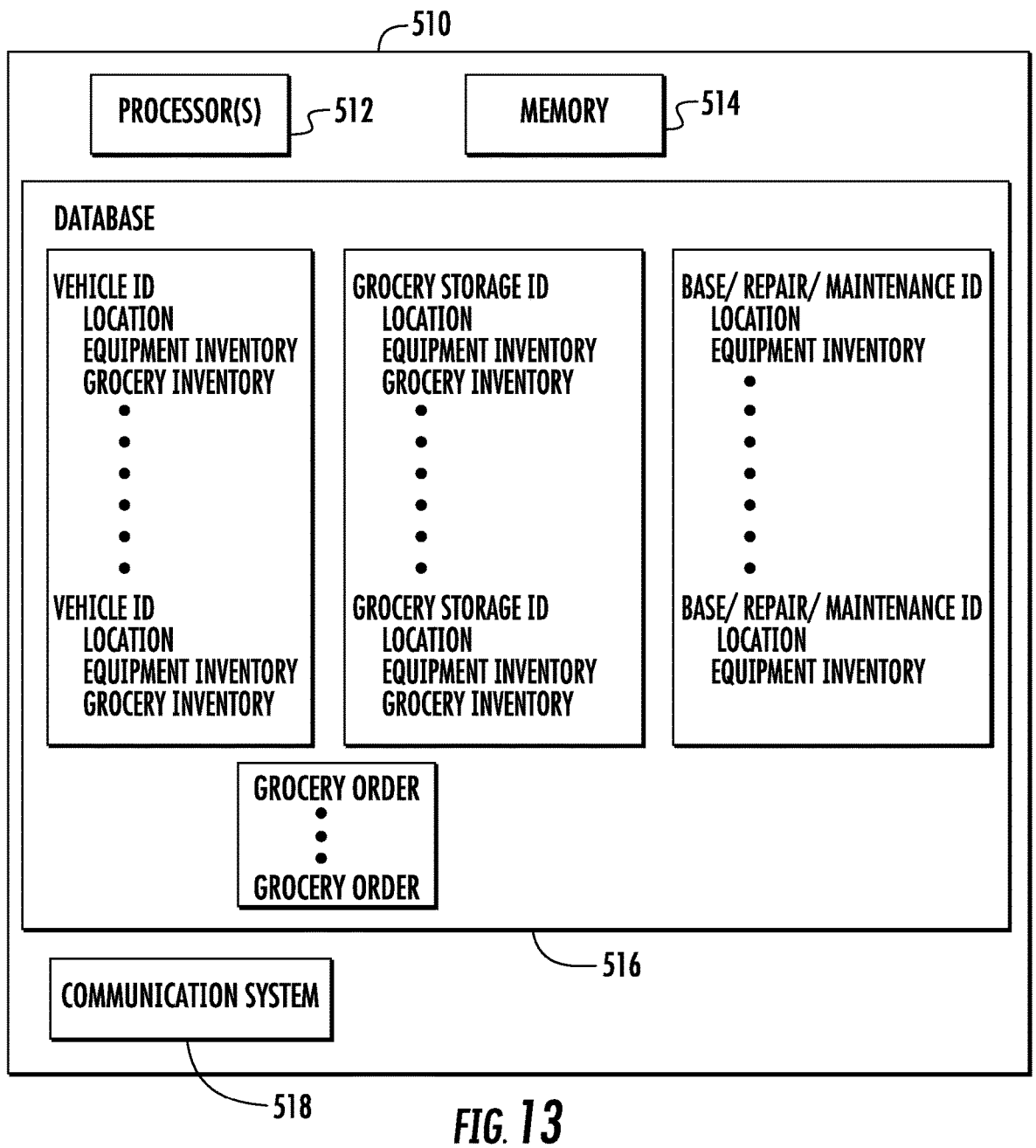
FIG. 13 is a block diagram of exemplary components of a grocery delivery server for the autonomous vehicle management system of the present disclosure.

In accordance with aspects of the present disclosure, and with reference to FIGS. 12 and 13, a grocery delivery management system 510 is provided that receives Internet grocery orders and communicates the grocery orders to autonomous robot vehicles 101 for delivery of grocery items to delivery destinations. In particular, the following will now describe control and processing in connection with managing delivery of grocery items by autonomous vehicles, where the autonomous vehicles control temperature and/or humidity conditions within a compartment en route to a destination.

One embodiment of grocery delivery system 501 can include one or more servers 510 (e.g., grocery delivery management server) that are in communication with a network 530, which can include any network technology including, for instance, a cellular data network, a wired network, a fiber optic network, a satellite network, and/or an IEEE 802.11a/b/g/n/ac wireless network, among others. Customer devices 540 can communicate with the server 510 through the network 530. A customer device 540 can be any electronic device described herein or not described herein, including smartphones, tablets, laptops, desktop computers, set-top boxes, smart watches, or another device.

In accordance with one aspect of the present technology, the customer devices 540 can use software applications to communicate with the server 510. In various embodiments, the software application can be a mobile app, a web browser that loads a particular URL, or a standalone computer application, among other things. The software application can include a menu of grocery items may or may not require temperature and/or humidity control en route during delivery (not shown), and can permit a grocery order to be completed specifying desired grocery items and a delivery destination. The software application on the customer devices communicates the grocery order to the server 510, which receives the grocery order and communicates it to one or more autonomous vehicles 101.

As seen in FIG. 13, there is shown a block diagram of exemplary components of the grocery delivery management server 510, including one or more processor(s) 512, one or more memory 514, a database 516, and a communication system 518. The memory 514 can store instructions for execution by the processor(s) 512 to carry out the operations described herein. The communication system 518 can operate to receive orders from software applications and can communicate with the autonomous robot vehicles 101. The database 516 can store the grocery orders and can also store information for each of the autonomous robot vehicles 101, including, for example, vehicle ID, grocery storage/staging ID, base/repair/maintenance station ID, locations, equipment inventory, grocery inventory etc. Different vehicles 101 may have different equipment and grocery offerings. For example, one vehicle may include equipment such as a freezer module, a heater module, and/or a refrigerator module. Another vehicle may include only a freezer module. Yet another module may include a heater module and an ambient temperature module. Likewise, grocery storage locations may have different offerings such as generally grocery items at one location (e.g., eggs, milk, cereal) or specialty offering at another location (e.g., Chinese food, liquor, kosher food, Thai food, balloons, cards, videos, merchandise, etc.) This information is stored in the database 516 of the server 510. The database 516 can also store the location of each autonomous robot vehicle 101 and/or the various customer, vendor, repair shop locations, equipment, etc. As described above herein, each vehicle 101 can include GPS navigation capability. The autonomous robot vehicles 101 can communicate their locations to the server 510, which can store the location information in the database 516. The listing of database information in FIG. 13 is exemplary, and other information regarding grocery orders or autonomous vehicles can be stored in the database 516.

With continuing reference to FIG. 13, when the server 510 receives a grocery order, the server 510 determines which autonomous vehicles 101 may be capable of fulfilling the order. In particular, in accordance with aspects of the present disclosure, the grocery order can specify grocery items to be temperature and/or humidity controlled en route during delivery to a destination. The grocery delivery management system 510 can access the database 516 to access the equipment inventory and grocery inventory for the autonomous vehicles 101, and to determine which vehicles 101 include the ordered grocery item and the equipment for controlling the temperature and/or humidity of the grocery item. In various embodiments, the server 510 can additionally access the location of each vehicle 101.

In various embodiments, the server 510 can communicate the grocery order to one or more of the eligible vehicles 101 that include the grocery item and the necessary module (e.g., freezer, refrigerator, heater, dryer, humidifier, etc.). In various embodiments, the server 510 can assign the grocery order to the eligible vehicle 101 that is closest to the delivery destination. In various embodiments, the server 510 can assign the grocery order to the eligible vehicle 101 that has the fewest number of grocery orders. In various embodiments, the server 510 can assign the grocery order to the eligible vehicle 101 that has the optimal balance of distance and number of grocery orders for delivery. In various embodiments, the server 510 can communicate the grocery order to one or more eligible vehicles 101, and each eligible vehicle 101 can either accept the order or reject the order. In various embodiments, the server 510 can broadcast the grocery order to all eligible vehicles 101, and the eligible vehicles 101 can respond with a "bid" for the grocery order, such that the vehicle 101 with the highest bid can be assigned the grocery order. In various embodiments, an autonomous robot vehicle 101 that is assigned a grocery order can respond to the server 510 with a delivery time estimate for the grocery order, and the server 510 can communicate the time estimate to the customer device 540. The various ways of assigning a grocery order to an autonomous vehicle are exemplary, and other ways of assigning a grocery order to an autonomous vehicle are contemplated.

In accordance with aspects of the present disclosure, the server 510 can analyze historical grocery orders to identify grocery ordering patterns. For example, there may be recurring peak times when particular grocery orders are placed, such as coffee orders between 7:00 AM and 8:00 AM, or peak times when particular grocery orders are delivered to certain locations, such as pizza orders for delivery to a local high school between 11:30 AM and 12:30 PM. In various embodiments, the server 510 can preemptively instruct one or more robot vehicles 101 to preemptively prepare grocery orders before the orders are actually placed by consumers. In various embodiments, the server 510 can communicate actual grocery orders to the robot vehicles 101, with the grocery orders having no assigned customer. If a customer 202 places a grocery order that has been preemptively assigned to a robot vehicle 101, the server 510 can associate the customer 202 with the preemptive grocery order and communicate the customer information to the robot vehicle 101. The disclosed embodiments are exemplary, and other variations and embodiments of implementing grocery order analytics and forecasts, and implementing preemptive grocery orders, are contemplated to be within the scope of the present disclosure.

In accordance with aspects of the present disclosure, and with reference again to FIG. 6, the following will describe control and processing of an autonomous robot vehicle 101 that receives a grocery order. As shown in FIG. 6, an autonomous robot vehicle 101 includes a robot processor 125. The robot processor 125 executes instructions stored in a memory (not shown) to perform the operations described herein, including determining a travel route for delivering grocery orders. In various embodiments, an autonomous robot vehicle 101 that receives a grocery order for a delivery destination can use the navigation module 140 to determine a travel route that includes the destination.

With continuing reference to FIG. 6, after the processor 125 has selected a travel route, the processor 125 controls the conveyance system 130 to travel the travel route. During the travel, the processor 125 controls the securable storage compartments 102, 104 based on the temperature and/or humidity control requirements for the grocery orders Additional Features In some embodiments, the robot fleet 100 further includes at least one robot 101 having a digital display for curated content comprising: advertisements (e.g., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," "in certain embodiments," "in other embodiments," or the like may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. An autonomous vehicle for transporting or retrieving deliveries comprising:
    a conveyance system configured to autonomously drive the autonomous vehicle between a first location and a second location; and
    at least one securable storage compartment, the at least one securable storage compartment including at least one securable storage sub-compartment, the at least one securable storage compartment or sub-compartment being removable from the autonomous vehicle for selective replacement of the at least one securable storage compartment or sub-compartment, the at least one securable storage compartment or sub-compartment configured to receive at least one item at the first location, the at least one securable storage compartment or sub-compartment being operatively coupled to an ambient air control module configured to control ambient air in the at least one securable storage compartment or sub-compartment within a predetermined ambient air control range to provide ambient air control for the at least one securable storage compartment or sub-compartment as the conveyance system drives the autonomous vehicle between the first location and the second location.

2. The autonomous vehicle of claim 1, wherein the ambient air control module includes a temperature control module configured to control temperature levels within the at least one securable storage compartment or sub-compartment.

3. The autonomous vehicle of claim 1, wherein the ambient air control module includes a humidity control module configured to control humidity levels within the at least one securable storage compartment or sub-compartment.

4. The autonomous vehicle of claim 1, wherein the at least one securable storage compartment or sub-compartment is assignable to a customer.

5. The autonomous vehicle of claim 4, wherein the at least one securable storage compartment or sub-compartment is configured to open for the customer.

6. The autonomous vehicle of claim 5, wherein the at least one securable storage compartment or sub-compartment is configured to open for the customer in response to a code provided by the customer.

7. A system comprising:
a fleet of autonomous vehicles including the autonomous vehicle of claim 1.

8. An autonomous vehicle for transporting or retrieving deliveries comprising:
a conveyance system configured to autonomously drive the autonomous vehicle between a first location and a second location; and
at least one securable storage compartment, the at least one securable storage compartment including at least one securable storage sub-compartment, the at least one securable storage compartment or sub-compartment being removable from the autonomous vehicle for selective replacement of the at least one securable storage compartment or sub-compartment, the at least one securable storage compartment or sub-compartment configured to receive at least one item at the first location, the at least one securable storage compartment or sub-compartment including an ambient air control module configured to control ambient air in the at least one securable storage compartment or sub-compartment within a predetermined ambient air control range to provide ambient air control for the at least one securable storage compartment or sub-compartment as the conveyance system drives the autonomous vehicle between the first location and the second location.

9. The autonomous vehicle of claim 8, wherein the ambient air control module includes a temperature control module configured to control temperature levels within the at least one securable storage compartment or sub-compartment.

10. The autonomous vehicle of claim 8, wherein the ambient air control module includes a humidity control module configured to control humidity levels within the at least one securable storage compartment or sub-compartment.

11. The autonomous vehicle of claim 8, wherein the at least one securable storage compartment or sub-compartment is assignable to a customer.

12. The autonomous vehicle of claim 11, wherein the at least one securable storage compartment or sub-compartment is configured to open for the customer.

13. The autonomous vehicle of claim 12, wherein the at least one securable storage compartment or sub-compartment is configured to open for the customer in response to a code provided by the customer.

14. A system comprising:
a fleet of autonomous vehicles including the autonomous vehicle of claim 8.

15. A delivery system for transporting or retrieving deliveries, comprising:
an autonomous vehicle including at least one securable storage compartment, the at least one securable storage compartment including at least one securable storage sub-compartment, the at least one securable storage compartment or sub-compartment configured to receive at least one item, the at least one securable storage compartment or sub-compartment being removable from the autonomous vehicle for selective replacement of the at least one securable storage compartment or sub-compartment, the at least one securable storage compartment or sub-compartment being operatively coupled to or including an ambient air control module configured to control ambient air in the at least one securable storage compartment or sub-compartment within a predetermined ambient air control range;
a database configured to store information of a location;
at least one processor; and
a memory storing instructions which, when executed by the at least one processor, cause the autonomous vehicle to transport the at least one item to the location.

16. The delivery system of claim 15, wherein the ambient air control module includes a temperature control module configured to control temperature levels within the at least one securable storage compartment or sub-compartment.

17. The delivery system of claim 15, wherein the ambient air control module includes a humidity control module configured to control humidity levels within the at least one securable storage compartment or sub-compartment.

18. The delivery system of claim 15, wherein the at least one securable storage compartment or sub-compartment is assignable to a customer.

19. The delivery system of claim 18, wherein the at least one securable storage compartment or sub-compartment is configured to open for the customer.

20. The delivery system of claim 19, wherein the at least one securable storage compartment or sub-compartment is configured to open for the customer in response to a code provided by the customer.

* * * * *